//  # 3,035,058
DYESTUFFS OF THE ANTHRAQUINONE SERIES CONTAINING DICHLOROPYRIMIDYL
Jacques Guenthard, Basel, Switzerland, assignor to Sandoz Ltd., Basel, Switzerland
No Drawing. Filed Nov. 25, 1958, Ser. No. 776,197
Claims priority, application Switzerland Nov. 29, 1957
6 Claims. (Cl. 260—256.5)

This invention relates to dyestuffs of the anthraquinone series which contain reactive groups and correspond to the formula:

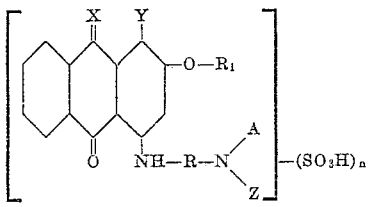

wherein
A stands for hydrogen or a low molecular alkyl radical,
R for an aryl radical which may be substituted,
$R_1$ for a phenyl radical which may be substituted,
X for oxygen and
Y for the amino or, together with X, for the grouping

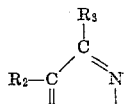

in which
$R_2$ represents a low molecular carbalkoxy radical, a low molecular alkylcarbonyl radical or a phenylcarbonyl radical which may be substituted, and
$R_3$ represents the hydroxy group, a low molecular alkyl radical or a phenyl radical which may be substituted, when $R_2$ denotes a low molecular carbalkoxy radical, or represents the hydroxy group, when $R_2$ denotes a low molecular alkylcarbonyl radical or a phenylcarbonyl radical which may be substituted,
Z for the radical of a cyclic, six-membered diazine compound containing two or three halogen atoms combined with carbon atoms, and
$n$ for one of the integers 2 or 3, and wherein the group

stands in the para-position to —NH—.

The process for their production consists in reacting 1 mole of a dyestuff of the formula

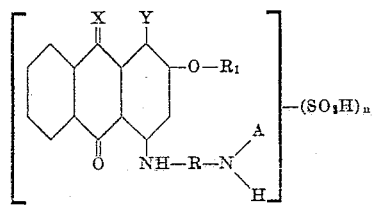

wherein A, R, $R_1$, X, Y and $n$ possess the aforecited meanings and wherein the group

is in para-position to the —NH— group, with at least 1 mole of a cyclic, six-membered diazine compound containing three or four halogen atoms combined with carbon atoms.

The dyestuffs of Formula II which are used as starting substances are either 1-aminoanthraquinone derivatives or 3-azabenzanthrone derivatives. Particularly interesting representatives of the 1-aminoanthraquinone compounds are, i.e. 1-amino-2-(4'-methyl)-, -(4'-ethyl)-, -(4'-tert.butyl)-, -(4'-tert.amyl)- or -(4'-iso-octyl)-phenoxy-4-(4''-amino)- or -(4''-methylamino)-phenylamino-anthraquinone-2'.2''-disulfonic acid, 1-amino-2-(5'-methyl)-phenoxy-4-(4''-amino) - phenylamino-anthraquinone-2'.2''-disulfonic acid, 1-amino-2-(4'-methyl)-phenoxy-4-[(4''-amino)-phenyl]-phenylaminoanthraquinone-2'.2''- or 2'.2'''-disulfonic acid.

Of the 3-azabenzanthrone derivatives the following may be named as examples: 1-benzoyl- or 1-acetyl- or 1-carbethoxy- or 1-carbomethoxy-2-hydroxy-4-phenoxy-6-(4''-amino)- or -(4''-methylamino)-phenylamino-3-azabenzanthrone-4'.2'' di- or -2'.4'.2''-trisulfonic acid, 1-acetyl- or -1-benzoyl- or 1-carbethoxy-2-hydroxy-4-(4'- or 5'-methyl)- or -(4'-tert. butyl)- or -(4'-tert. amyl)- or -(4'-iso-octyl)-phenoxy-6-(4''-amino)- or -(4''-methylamino) - phenylamino-3-azabenzanthrone-2'.2''-disulfonic acid, 1-acetyl- or 1-benzoyl- or 1-carbethoxy-2-hydroxy-4-phenoxy-6-[4''-(4'''-amino) - phenyl]-phenylamino-3-azabenzanthrone-4'.2''- or -4'.2'''-di- or -2'.4'.2''- or -2'.4'.2''-trisulfonic acid, 1-carbethoxy - 2 - methyl- or -phenyl-4-phenoxy-6-(4''-amino)- or -(4''-methylamino)-phenylamino-3-azabenzanthrone-4'.2''-di- or -2'.4'.2''-trisulfonic acid, 1-carbethoxy- or 1-carbomethoxy-2-methyl- or -phenyl-4-(4'-methyl)- or -(4'-ethyl)- or -(4'-tert. butyl)- or -(4'-tert. amyl)- or -(4'-iso-octyl)-phenoxy-6-(4''-amino)- or -(4''-methylamino)-phenylamino-3-azabenzanthrone-2'.2''-disulfonic acid, 1-carbethoxy-2-methyl- or -phenyl-4-(4'-methyl)-phenoxy-6-[4''-(4'''-amino)-phenyl]-phenylamino-3-azabenzanthrone-2'.2''- or 2'.2'''-disulfonic acid. Trichloropyrimidine, tribromopyrimidine and tetrachloropyrimidine are examples of diazine compounds coming within the scope of the present process.

The reaction of the dyestuffs of Formula II used as starting substances with a cyclic, six-membered diazine compound containing three or four halogen atoms combined with carbon atoms is carried out preferably in aqueous medium. For this purpose the trihalogeno- or tetrahalogeno-diazine compound may be applied as such in concentrated form or in solution in an organic solvent. Acetone is an outstandingly suitable solvent.

The reaction temperature is adapted to the reactivity of the individual starting substances and varies between 40° and 100° C. If it is desired to conduct the reaction at temperatures above 50–60° C., it is advisable to work in closed vessels fitted with reflux condensers.

The reaction is effected in a weakly alkaline medium, preferably within the pH region of 10.0 to 7.0. To neutralize the hydrogen halide formed an acid-binding agent such as sodium or ammonium acetate may be added at the start of the reaction or, alternatively, small portions of sodium or potassium carbonate or bicarbonate in solid powder form or as a concentrated aqueous solution may be added during the course of the reaction. Aqueous solutions of sodium or potassium hydroxide are also suitable as neutralizing agents. The addition of small amounts of a wetting or emulsifying agent to the reaction mixture can accelerate the rate of reaction.

In the reaction of the trihalogeno- or tetrahalogenodiazine compound with the —NH—A group only one halogen atom reacts with an exchangeable hydrogen atom.

On completion of condensation the dyestuff formed is salted out from the previously neutralized solution or suspension with sodium or potassium chloride or precipitated with an acid. It is then filtered with suction, washed neutral, and dried.

The dyestuffs obtained in accordance with the present process are suitable for dyeing, padding and printing fibers of vegetable and animal origin, fibers of regenerated cellulose, casein fibers, animalized cellulosic fibers, polyamide fibers, mixtures of the preceding fibers, and leather. The dyed material is treated in the dyebath or in a subsequent operation with an agent of alkaline reaction with heating. The dyeings possess good fastness to light, washing, milling and perspiration. Polyester fibers, secondary cellulose acetate and cellulose triacetate are reserved.

In the following examples the parts and percentages are by weight and the temperatures are in degrees centigrade.

EXAMPLE 1

66.5 parts of the dyestuff 1-amino-2-(4'-tert.amyl)-phenoxy - 4 - (4''-methylamino)-phenylaminoanthraquinone-2'.2''-disulfonic acid are dissolved in 1000 parts of water with about 25 parts of a 30% sodium hydroxyde solution to give a neutral reaction. After the addition of 20 parts of trichloropyrimidine the temperature is increased to 80° with vigorous agitation. The pH value is maintained between 8.0 and 9.0 by the addition of a 10% sodium carbonate solution.

When the condensation reaction has run its course 100 parts of sodium chloride are strewn into the solution, upon which the new dyestuff is precipitated. It is filtered off, washed with a dilute aqueous solution of sodium chloride, and dried in vacuo at 50–60°. The dark powder obtained dissolves in water to give violet solutions.

On padding a cellulosic fiber fabric with an aqueous solution of this dyestuff and heat-treating the padding in presence of an agent of alkaline reaction, a bluish violet dyeing fast to light and wet treatments is obtained.

Table 1 below lists further dyestuffs containing reactive groups which can be produced by the process described in Example 1. These dyestuffs have the formula

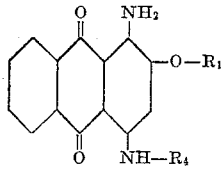

To simplify the nomenclature the abbreviations DDZ and TDZ respectively are used for the dichloropyrimidyl radical and the trichloro pyrimidyl radical.

Table 1

| Example | $R_1$ | $R_4$ | Shade of Dyeing on Cotton |
|---|---|---|---|
| 2 | 2'.4'-disulfophenoxy | 4'''-[4'''-DDZ-aminophenyl]-2''-sulfophenylamino. | blue-violet. |
| 3 | 4'-t.butyl-2'-sulfophenoxy. | 4'''-DDZ-amino-2''-sulfophenylamino. | violet. |
| 4 | 4'-methyl-2'-sulfophenoxy. | 4'''-TDZ-methyl amino-2''-sulfophenylamino. | Do. |
| 5 | 4'-sulfophenoxy | 4'''-DDZ-methylamino-2''-sulfophenylamino. | Do. |
| 6 | 4'-iso-octyl-2'-sulfophenoxy. | 4'''-DDZ-amino-2''-sulfophenylamino. | Do. |
| 7 | 4'-ethyl-2'-sulfophenoxy. | do | Do. |

EXAMPLE 8

38.35 parts of sodium 1-benzoyl-2-hydroxy-4-(4'-methyl) - phenoxy - 6 - (4''-amino)-phenylamino-3-azabenzanthrone-2'.2''-disulfonate are dissolved in 1000 parts of water at 60°. 10 parts of trichloropyrimidine are added, the temperature increased to 80° and a pH value of between 8.0 and 9.0 is maintained by addition of a 10% sodium carbonate solution. The mass is stirred until such time as the starting substance is no longer indicated in a sample by chromatography on a talc column.

The dyestuffs is precipitated by means of 100 parts of common salt, filtered off and dried in vacuo.

100 parts of a cotton sateen fabric are padded at room temperature with a 2% aqueous neutral solution of the above dyestuff in presence of 1 gram per liter of turkey red oil, and squeezed to 1.6 to 2.2 times its original dry weight. The moist fabric is treated in a developing bath (liquor ratio 50:1) containing 300 grams per liter of common salt and 5 ml. per liter of sodium hydroxide solution of 66° Tw. (36° Bé.) for 20–30 minutes at 90–95°. It is then thoroughly rinsed in cold water, soaped at the boil for 20 minutes with 5 grams per liter of soap and 2 grams per liter of sodium bicarbonate (liquor ratio 20:1), again well rinsed, and dried. A violet dyeing fast to light and wet treatments is obtained.

EXAMPLE 9

33.75 parts of 1-carbethoxy-2-methyl-4-phenoxy-6-(4''-amino)-phenylamino-3-azabenzanthrone - 4'.2'' - disulfonic acid are dissolved in 1000 parts of water and 14 parts of a 30% sodium hydroxide solution at 60°. At the same temperature 25 parts of tetrachloro-pyrimidine are added in small portions and simultaneously a 10% sodium carbonate solution is added dropwise to the solution to maintain the pH value of 8.0 to 9.0. The temperature is then increased to 80°. The reaction is completed when the starting substance is no longer indicated in a sample. The dyestuff is precipitated with 100 parts of sodium chloride, filtered off, washed with brine until neutral reaction, and finally dried in vacuo at 50–60°. A powder is obtained which is soluble in water with an orange-red coloration and dyes natural and regenerated cellulosic fibers from weakly alkaline dyebaths in orange-red shades which are fast to light and wet treatments.

In Table 2 are listed a number of dyestuffs containing reactive groups which are obtainable according to the processes of Examples 8 and 9. They correspond to the formula

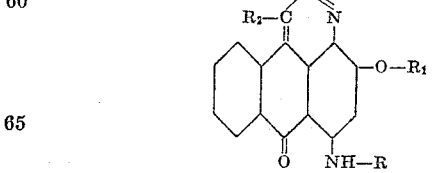

and are characterized by the symbols $R_1$, $R_2$, $R_3$ and $R_4$ and by the shade of the dyeings on cotton.

To simplify the nomenclature the abreviations DDZ and TDZ respectively are used for the dichloropyrimidyl radical and the trichloropyrimidal radical.

Table 2

| Example | R₃ | R₂ | R₁ | R₄ | Shade of Dyeing on Cotton |
|---|---|---|---|---|---|
| 10 | hydroxy | acetyl | 4'-isooctyl-2'-sulfophenoxy | 4''-DDZ-amino-2''-sulfophenylamino | violetish red. |
| 11 | do | carbethoxy | 4'-methyl-2'-sulfophenoxy | 4''-DDZ-(N-methyl)-amino-2''-sulfophenylamino | Do. |
| 12 | do | benzoyl | 2',4 disulfophenoxy | 4''[(4'''-DDZ-amino)-phenyl]-2''-sulfophenylamino | reddish violet. |
| 13 | do | do | 4'-t.amyl-2'-sulfophenoxy | 4''-DDZ-amino-2''-sulfophenylamino | violetish red. |
| 14 | do | carbethoxy | do | 4''-TDZ-(N-methyl)-amino-2''-sulfophenylamino | Do. |
| 15 | methyl | do | 4'-methly-2'-sulfophenoxy | 4''-DDZ-(N-methyl)-amino-2''-sulfophenylamino | orange red. |
| 16 | do | do | 4'-isooctyl-2'sulfophenoxy | 4''-DDZ-amino-2''-sulfophenylamino | Do. |
| 17 | phenyl | do | 2',4'-disulfophenoxy | 4''DDZ-(N-methyl)-amino-2''-sulfophenylamino | Do. |
| 18 | methyl | carbomethoxy | 4'-t.amyl-2'-sulfophenoxy | 4''-[4'''-DDZ-aminophenyl]-2''-sulfophenylamino | red. |
| 19 | do | do | do | 2''-TDZ-amino-2''-sulfophenylamino | orange red. |
| 20 | hydroxy | do | 4'-ethyl-2'-sulfophenoxy | 4''-DDZ-amino-2''-sulfophenylamino | violetish red. |
| 21 | do | acetyl | 4'-tert.butyl-2'-sulfophenoxy | do | Do. |
| 22 | do | do | 4'-n-heptyl-2'-sulfophenoxy | do | Do. |
| 23 | do | do | 4'-n-hexyl-2'-sylfophenoxy | 4''-DDZ-(N-methyl)-amino-2''-sulfophenylamino | Do. |
| 24 | do | benzoyl | 4'-tert.amyl-2'-sulfophenoxy | do | Do. |
| 25 | do | do | 4'-isopropyl-2'-sulfophenoxy | 4''-TDZ-amino-2''-sulfophenylamino | Do. |

Formulae of representative dyestuffs of the foregoing examples are:

Example 1—

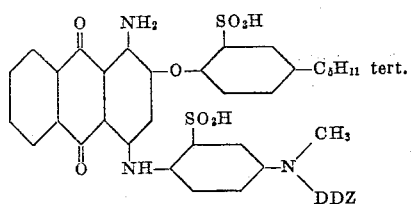

DDZ=radical of dichloropyrimidine

Example 3—

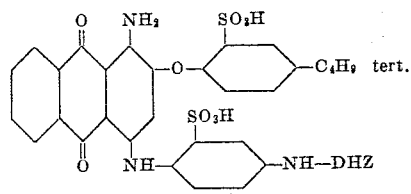

Example 8—

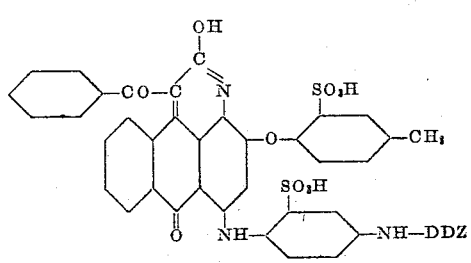

Example 9—

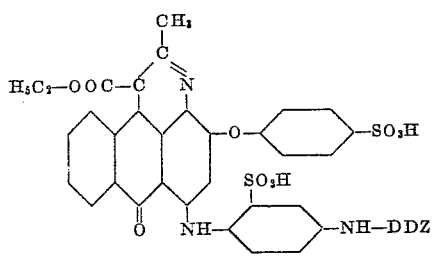

Example 11—

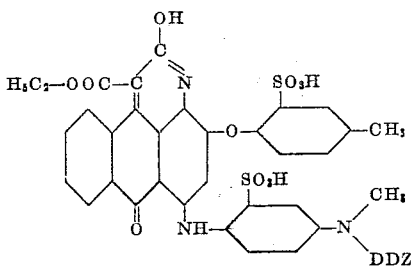

Example 24—

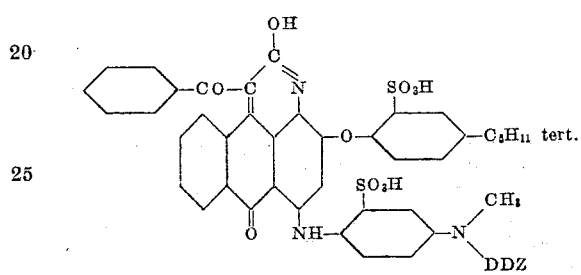

Having thus disclosed the invention what I claim is:
1. An anthraquinone dyestuff of the formula

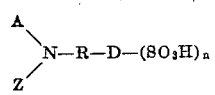

wherein

A is a member selected from the group consisting of hydrogen and lower alkyl;
R is a member selected from the group consisting of phenylene and biphenylene,
Z is a member selected from the group consisting of dichloropyrimidyl and trichloropyrimidyl, wherein the chlorine atoms and the group —NA— are each bound to a carbon atom of the pyrimidine ring;
n is an integer ranging from 2 to 3; and D is a member selected from the group consisting of

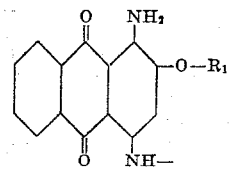

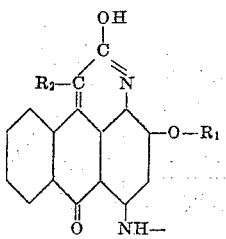

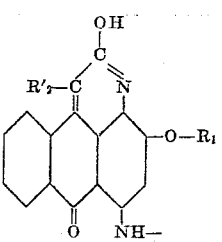

and

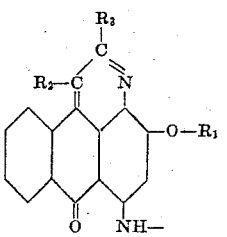

wherein

R₁ is a member selected from the group consisting of phenyl and alkylphenyl wherein alkyl has from 1 to 8 carbon atoms;
R₂ is a member selected from the group consisting of carbomethoxy and carboethoxy;
R'₂ is a member selected from the group consisting of acetyl and benzoyl, and
R₃ is a member selected from the group consisting of methyl and phenyl;

the group —NH— in D standing in para-position to the group

2. The anthraquinone dyestuff of the formula

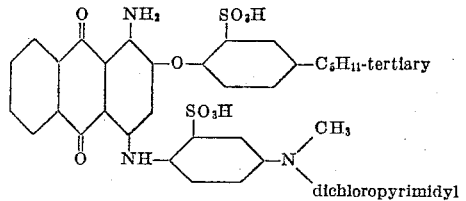

3. The anthraquinone dyestuff of the formula

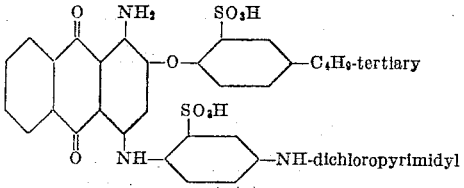

4. The anthraquinone dyestuff of the formula

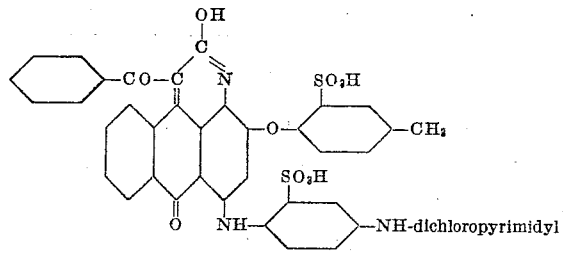

5. The anthraquinone dyestuff of the formula

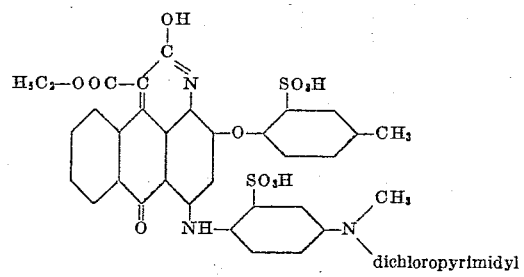

6. The anthraquinone dyestuff of the formula

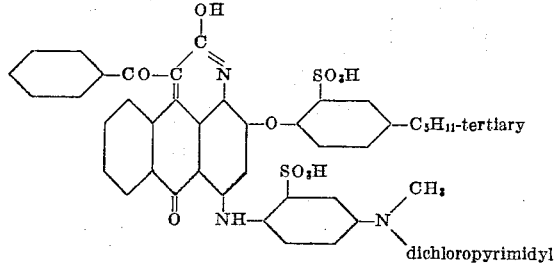

References Cited in the file of this patent
UNITED STATES PATENTS

| | | |
|---|---|---|
| 2,580,190 | Peter et al. | Dec. 25, 1951 |
| 2,759,940 | Bucheler et al. | Aug. 21, 1956 |
| 2,773,871 | Brassel et al. | Dec. 11, 1956 |

FOREIGN PATENTS

| | | |
|---|---|---|
| 349,126 | Great Britain | May 19, 1931 |

UNITED STATES PATENT OFFICE
CERTIFICATE OF CORRECTION

Patent No. 3,035,058                                          May 15, 1962

Jacques Guenthard

It is hereby certified that error appears in the above numbered patent requiring correction and that the said Letters Patent should read as corrected below.

Column 1, lines 54 to 57, the formula should appear as shown below instead of as in the patent:

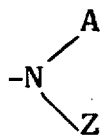

column 3, line 29, for "hydroxyde" read -- hydroxide --;
column 4, lines 57 to 66, lower right-hand portion of the formula, for

column 5, lines 19 to 25, lower right-hand portion of the formula, for "-NH-DHZ" read -- -NH-DDZ --.

Signed and sealed this 20th day of November 1962.

(SEAL)
Attest:

ERNEST W. SWIDER                                         DAVID L. LADD

Attesting Officer                                              Commissioner of Patents